(12) United States Patent
Reininger

(10) Patent No.: US 6,807,894 B2
(45) Date of Patent: Oct. 26, 2004

(54) CONTRACTION UNIT WITH POSITION SENSOR DEVICE

(75) Inventor: Thomas Reininger, Wernau/Neckar (DE)

(73) Assignee: Festo AG & Co., Esslingen (DE)

(*) Notice: Subject to any disclaimer, the term of this patent is extended or adjusted under 35 U.S.C. 154(b) by 61 days.

(21) Appl. No.: 10/383,473

(22) Filed: Mar. 7, 2003

(65) Prior Publication Data
US 2003/0172801 A1 Sep. 18, 2003

(30) Foreign Application Priority Data
Mar. 8, 2002 (DE) .......................................... 102 10 332

(51) Int. Cl.[7] .............................................. F15B 15/02
(52) U.S. Cl. .......................................... 92/5 R; 92/92
(58) Field of Search .......................... 91/1; 92/5 R, 89, 92/90, 91, 92, 253

(56) References Cited
U.S. PATENT DOCUMENTS
4,860,639 A * 8/1989 Sakaguchi .................. 92/5 R FOREIGN PATENT DOCUMENTS
| DE | 299 06 626.6 | 7/1999 |
| DE | 299 08 008.0 | 7/1999 |
| DE | 201 12 633.8 | 2/2002 |
| EP | 0 161 750 B1 | 11/1985 |

* cited by examiner

Primary Examiner—Thomas E. Lazo
(74) Attorney, Agent, or Firm—Hoffman & Baron, LLP

(57) ABSTRACT

A contraction unit with a contraction tube that extends between two spaced head pieces and that contracts in length when pressure builds upon the inside proposed, which is provided with a position sensor device for detecting the distance between the head pieces based on the expansion of an elastic measurement object with the help of an expansion measurement device, wherein the measurement object extends between head pieces or in or on the wall of the contraction tube.

13 Claims, 2 Drawing Sheets

CONTRACTION UNIT WITH POSITION SENSOR DEVICE

This application claims priority to German patent application number 102 10 332.1 filed on Mar. 8, 2002, which is incorporated herein by reference.

BACKGROUND OF THE INVENTION

1. Field of the Invention

The invention concerns a contraction unit with a contraction tube that extends between two spaced head pieces and that contracts in length when pressure is built up on the inside.

2. Description of the Prior Art

Such contraction units are known from, e.g., the brochure "Fluidic Muscle" published by the applicant, EP 0161750 B1, DE 29906626 U, DE 29908008 U, or DE 20112633 U. These units can be used for very precise positioning with a simple and low wear and tear design and at relatively low costs. Very high positioning forces can be achieved.

In principle, for exact positioning, some type of position sensor or location sensor is required for actuators. In connection with position cylinders, a plurality of such position sensors and sensor devices are known, which work according to a wide range of measurement principles. However, these are absolutely unsuitable or only poorly suitable for contraction units of the previously mentioned type.

OBJECT AND SUMMARY OF THE INVENTION

One problem of the present invention is to create a position sensor device that is well suited for such contraction units and that can realize higher precision easily and cost-effectively.

This problem is solved according to the invention by a contraction unit with a position sensor device with the features of claim 1.

More specifically, the advantage of the solution according to the invention is that an elastic measurement object can be realized very easily between the head pieces or in or on the wall of the contraction tube and can detect expansion with the help of an expansion measurement device, wherein the expansion of the measurement object is a measure for the distance between the head pieces of the contraction unit, i.e., for their position. Because both the expansion measurement device and also the elastic measurement object are arranged or integrated within the contraction tube or in its wall, a compact contraction unit is produced, whose position sensor device requires no additional outer elements which could cause mechanical damage or malfunction. One of the principle advantages of such contraction units, the complete seal and thus the low consumption of operating fluid, is not adversely affected by the position sensor device.

The measures listed in the subordinate claims permit advantageous refinements and improvements of the contraction unit indicated in claim 1.

In a first advantageous configuration, the measurement object is a stretched strand made of an electrically conductive plastic or rubber material stretched between the head pieces, wherein the expansion measurement device is designed as a resistance measurement device for the electrical resistance of the stretched strand. Such a solution can be realized especially simply and cost-effectively and is practically insusceptible to malfunction.

Thus, the two end regions of the stretched strand can be connected directly to the resistance measurement device or to the two head pieces, so that the resistance between the two head pieces is measured. Alternatively, the stretched strand can also consist of two parallel partial strands with first regions that are connected electrically to each other and second end regions that are connected to the resistance measurement device. The second configuration has the advantage that the electrical measurement device only has to be connected to one of the two head pieces.

In an alternative configuration, the measurement object can also be designed as a measurement strand and can consist of an electrically conductive plastic or rubber material, which is arranged in or on the wall of the contraction tube. The expansion measurement device is formed as a resistance measurement device for the measurement strand. Thus, the measurement strand can be preferably integrated in the wall of the contraction tube.

The plastic or rubber material of the measurement object is preferably mixed with electrically conductive particles or fibers for generating the electrical conductivity. If the measurement strand is integrated into the wall of the contraction tube, these particles can also be arranged directly in regions, preferably elongated regions, of the contraction tube wall.

In another alternative configuration, the measurement object is a stretched strand made of a plastic or rubber material mixed with ferromagnetic particles or fibers stretched between the head pieces. The strand is at least partially overwrapped by a coil, wherein the expansion measurement device is designed as an inductance, frequency, or resonance measurement device and the coil forms a part of this device. When the contraction unit contracts, the ferromagnetic portion in the coil increases, so that the inductance of the coil changes as a function of the position of one head piece relative to the other head piece. If this coil forms a part of a resonant circuit, then this action changes the frequency or resonance frequency. Thus, the coil advantageously forms a resonance resonant circuit together with the capacitor.

In another alternative configuration, the expansion measurement device has at least one expansion sensor, which is arranged on the wall of the contraction tube or on a stretched strand in tension between the head pieces. When the tube contracts, the expansion of the wall or the stretched strand changes, so that the position can also be detected indirectly. Preferably, the expansion sensor is formed as a wire strain gauge or a magneto-elastic sensor.

BRIEF DESCRIPTION OF THE DRAWINGS

Embodiments of the invention are illustrated in the drawing and are described in more detail in the following description. Shown are.

DETAILED DESCRIPTION OF THE PREFERRED EMBODIMENTS

Figure 1:
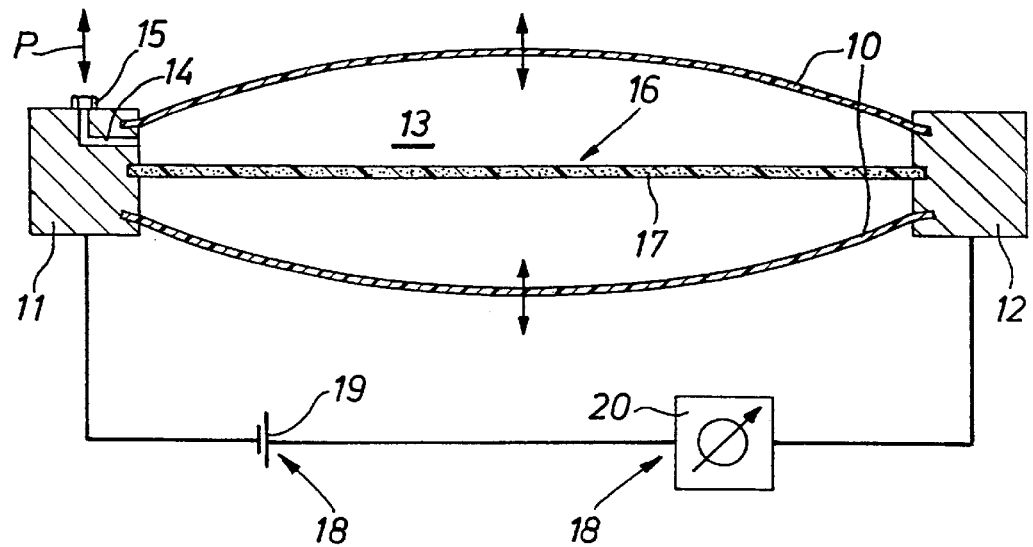
FIG. 1, a first embodiment with an electrically conductive, stretched strand in tension between the head pieces, FIG. 2, a similar arrangement with a stretched strand consisting of two parallel partial strands, whose first end regions are electrically connected to each other, as a second embodiment, FIG. 3, a third embodiment with a stretched strand that contains ferromagnetic particles or fibers and that is in tension between the head pieces, and a measurement coil, and FIG. 4, a fourth embodiment with a strain gauge on a stretched strand in tension between the head pieces.

The contraction element illustrated in FIG. 1 is shown only schematically to simplify the illustration. A detailed illustration is located in DE 29906626 U mentioned above. A contraction tube 10 made from an elastic rubber or plastic material is sealed tight on both sides by head pieces 11, 12. In the wall of the contraction tube 10 there is usually a bending-flexible strand structure that is not illustrated for reasons of simplification. The contraction tube 10 is connected to the two head pieces 11, 12 such that the contraction tube 10 provided with the strand structure can transmit tensile forces to the corresponding head piece 11, 12. The mounting can be realized, e.g., in the form of a clamping joint, as described, for example, in EP 0161750 B1. Other mounting types are also possible.

A fluid channel 14 opens into the interior space 13 bounded by the contraction tube 10 and the two head pieces 11, 12. This channel passes through one of the head pieces 11 and its outer end is provided with a connection device 15, which allows the attachment of a fluid line coming from a pressure source. In principle, several fluid channels can also be provided. In connection with a not-illustrated control valve arrangement, this allows a compressed fluid medium to be fed into the interior space 13 or to be discharged out of this space through the fluid channel 14.

FIG. 1 shows the contraction tube 10 in the activated state, i.e., for an interior space 13 charged with pressure. In this state, the contraction tube 10 is extended in the radial direction and at the same time contracted in the axial direction, so that the two head pieces 11, 12 approach each other in the axial direction and are pulled together. In the deactivated state, i.e., for a low-pressure interior space 13, the contraction tube 10 assumes an essentially hollow-cylindrical state, and the two head pieces 11, 12 move apart from each other. Thus adjusted fluid charging of the interior space 13 produces a relative axial motion of the head pieces 11, 12.

As a position sensor device for detecting the relative position of the two head pieces 11, 12, a stretched strand 17 acting as a measurement object 16 made of an electrically conductive plastic or rubber material is stretched between the two head pieces 11, 12 in the interior space 13. This stretched strand 17 should be formed elastically such that it remains in tension under all working conditions of the contraction tube 10. The electrical resistance of the stretched strand 17 is measured by applying a resistance measurement device 18 to the two electrically conductive head pieces 11, 12. If the head pieces 11, 12 consist of non-conductive material, then a connection to the two end regions of the stretched strand 17 must be established in some other way.

In the simplest case, the resistance measurement device 18 consists of a series circuit comprising a voltage source 19 and a current measurement device 20. For increasing electrical resistance of the stretched strand 17, the current decreases and it increases for lower resistance. Obviously, other known resistance measurement devices can also be used.

The plastic or rubber material of the stretched strand 17 contains electrically conductive particles or fibers, e.g., made of metal or carbon, for generating the electrical conductivity. Nanotubes can also be included for generating the electrical conductivity in the stretched strand 17. If the two head pieces 11, 12 move away from each other, then the stretched strand 17 becomes longer, and the cross section simultaneously decreases, so that the electrical resistance increases. In the reverse case, the resistance decreases correspondingly. Thus, the electrical resistance of the stretched strand 17 is a measure for the distance between the two head pieces 11, 12.

Figure 2:
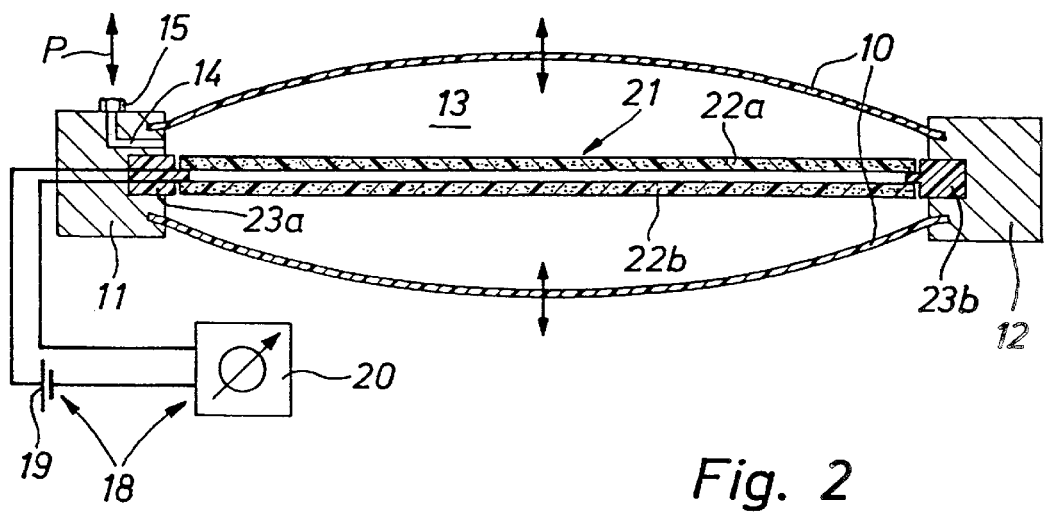

The second embodiment illustrated in FIG. 2 is very similar to the first embodiment. Here, the same or similar-acting components and elements are provided with the same reference numbers and are not described again. The second embodiment also concerns a resistance measurement of a stretched strand as a measurement object 21 stretched between the two head pieces 11, 12. The stretched strand consists of two parallel stretched strands 22a, 22b. These partial stretched strands 22a, 22b are anchored to the head pieces 11, 12 by means of insulated fastening elements 23a, 23b. In this way, the first ends of the partial stretched strands 22a, 22b on the head piece 12 are electrically connected to each other and the second ends of the two partial stretched strands 22a, 22b on the head piece 11 are connected to the resistance measurement device 18, which corresponds, e.g., to that of the first embodiment.

For the second embodiment, the resistance measurement device 18 can be attached to only one head piece 11, wherein the measured resistance value is given by the sum of resistance values of the two partial stretched strands 22a, 22b.

As a variation of the first and second embodiments, the stretched strand 17 or the partial stretched strands 22a, 22b can also be attached to or integrated into the wall, e.g., the inner wall of the contraction tube 10. On one hand, the stretched strand/s can be integrated in the wall of the contraction tube 10 or only in regions of the wall, e.g., elongated, strand-like regions, mixed with conductive particles or fibers, so that the wall in this region or in these regions is electrically conductive. The ends of these conductive regions must be in contact with the resistance measurement device, corresponding to the first and second embodiment.

The conductive regions or integrated strands in the wall of the contraction tube 10 can extend in arbitrary directions, wherein there should be at least regions extending in the axial direction. If there are several such regions, they are connected electrically in series.

Figure 3:
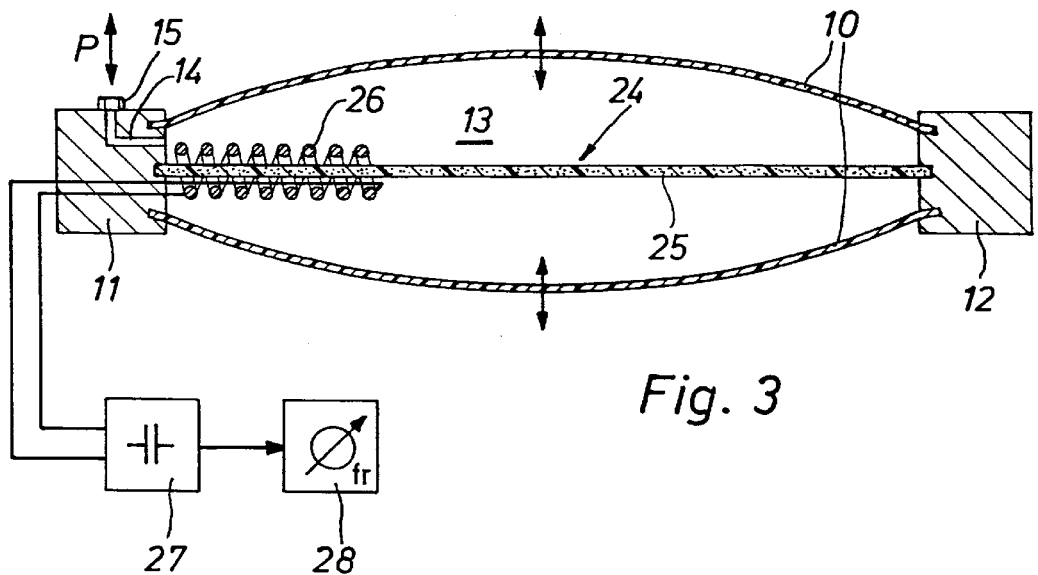

For the third embodiment illustrated in FIG. 3, the contraction element is also formed corresponding to the first embodiments. As a measurement object 24, there is a stretched strand 25 that corresponds geometrically to the stretched strand 17. For this embodiment, the strand is mixed with ferromagnetic particles or fibers, so that it exhibits ferromagnetic properties. At least one partial region of this stretched strand 25 extends through a coil 26 and acts like a magnetic core. This coil 26 is attached in an insulated way to one of the head pieces 11 and together with an external capacitor 27 forms an electrical resonant circuit. In principle, the capacitor 27 could obviously also be arranged in or on the head piece 11. A resonance measurement device 28 is connected to this resonant circuit.

If the head pieces 11, 12 move away from each other, then the stretched strand 25 expands, so that the number of ferromagnetic particles in the region of the coil 26 decreases. Its inductance thus decreases. This in turn leads to a change of the frequency or resonance frequency of the resonant circuit consisting of this coil 26 and the capacitor 27. The resonant circuit frequency or resonance frequency is detected with the resonance measurement device 28, so that the expansion of the stretched strand 25 and thus the distance between the head pieces 11, 12 is measured indirectly.

Instead of a resonance measurement device 28, there can also be another frequency measurement device or an inductance measurement device, wherein in the latter case an external capacitor 27 can be eliminated.

Figure 4:
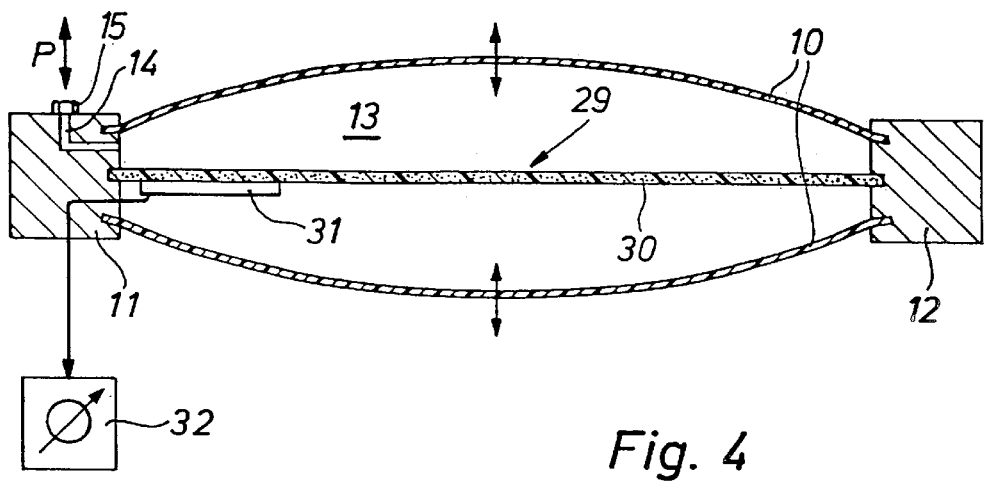

For the fourth embodiment illustrated in FIG. 4, a stretched strand 30 is stretched between the head pieces 11, 12 as a measurement object 29, which corresponds in principle to the stretched strand 17 of the first embodiment, however it does not have to contain electrically conductive particles. A wire strain gauge 31 is attached to this stretched strand 30, which is connected to an expansion measurement device 32. Here, the expansion of the stretched strand 30 and thus the distance between the head pieces 11, 12 can be determined directly.

Instead of a wire strain gauge 31, another known expansion sensor can be provided, e.g., a magneto-elastic sensor. The strain gauge 31 or other expansion sensor can also be attached to the wall of the contraction tube 10 or integrated into this wall, so that the stretched strand 30 can be eliminated. In this way, the expansion of the wall of the contraction tube 11 is also a measure for the distance between the head pieces 11, 12.

Instead of a single wire strain gauge 31 or expansion sensor, several such sensors can also be provided for increasing the accuracy.

According to the embodiments, the measurement object 16, 21, or the coil 26 and the wire strain gauge 31 are connected by means of electrical lines to an external measurement device. Alternatively, the measurement transmission to an external measured-value processing and evaluation device can be performed with a wireless method. Here, e.g., measurement objects 16, 21, the coil 26, or the strain gauge 31 can be connected to a wireless transmitter, e.g., a radio transmitter, arranged in one of the head pieces 11, 12, which transmits the corresponding measured values in a wireless method.

What is claimed is:

1. Contraction unit with a contraction tube that extends between two spaced head pieces and that contracts in length when pressure builds up on the inside and with a position sensor device for detecting the distance between the head pieces based on the expansion of an elastic measurement object with the help of an expansion measurement device, wherein the measurement object extends between the head pieces or in or on the wall of the contraction tube.

2. Contraction unit according to claim 1, characterized in that the measurement object is a stretched strand made of an electrically conductive plastic or rubber material stretched between the head pieces, and the expansion measurement device is formed as a resistance measurement device for the electrical resistance of the stretched strand.

3. Contraction unit according to claim 2, characterized in that the two end regions of the stretched strand are connected to the expansion measurement device formed as a resistance measurement device.

4. Contraction unit according to claim 2, characterized in that the stretched strand consists of two parallel partial strands with first end regions that are electrically connected to each other and second end regions that are connected to the expansion measurement device formed as a resistance measurement device.

5. Contraction unit according to claims 2, characterized in that the plastic or rubber material of the measurement object is mixed with electrically conductive particles or fibers generating the conductivity.

6. Contraction unit according to claim 5, characterized in that the electrically conductive particles or fibers are arranged directly in at least one elogated region of the wall of the contraction tube.

7. Contraction unit according to claim 1, characterized in that the measurement object is formed as a measurement strand and consists of an electrically conductive plastic or rubber material, which is arranged in or on the wall of the contraction tube, and the expansion measurement device is formed as a resistance measurement device for the measurement strand.

8. Contraction unit according to claim 7, characterized in that the measurement strand is integrated in the wall of the contraction tube.

9. Contraction unit according to claim 8, characterized in that the electrically conductive particles or fibers are arranged directly in at least one elongated region of the wall of the contraction tube.

10. Contraction unit according to claim 1, characterized in that the measurement object consists of a stretched strand made of a plastic or rubber material mixed with ferromagnetic particles or fibers stretched between the head pieces, were the strand is at least partially overwrapped by a coil, and the expansion measurement device is formed as a frequency or resonance measurement device, wherein the coil form a part of this measurement device.

11. Contraction unit according to claim 10, characterized in that the coil forms a resonant circuit together with a capacitor, in particular a resonant oscillation circuit.

12. Contraction unit according to claim 1, characterized in that the expansion measurement device as at least one expansion sensor, which is arranged on the wall of the contraction tube or on a stretched strand in tension between the head pieces.

13. Contraction unit according to claim 12, characterized in that the expansion sensor is formed as a wire strain gauge or magneto-elastic sensor.

* * * * *

UNITED STATES PATENT AND TRADEMARK OFFICE
CERTIFICATE OF CORRECTION

PATENT NO. : 6,807,894 B2
DATED : October 26, 2004
INVENTOR(S) : Reininger

It is certified that error appears in the above-identified patent and that said Letters Patent is hereby corrected as shown below:

Title page,
Item [74], *Attorney, Agent, or Firm,* now reads "Hoffman and Baron, LLP...", and should read -- Hoffmann and Baron, LLP... --.
Item [57], ABSTRACT,
Line 7, now reads "measurement object extends between the head pieces", and should read -- measurement object either: extends between the head pieces; --.

Column 1,
Line 35, now reads "This problem....of claim 1.", and should be deleted.
Line 40, now reads "can be realized very easily", and should read -- can be located either --;
Line 55, now reads "The measures listed...claim 1.", and should be deleted.

Column 5,
Line 40, now reads "object extends between the head pieces...", and should read -- object either extends between the head pieces --.
Lines 41-42, now reads "object extends between the head pieces or in", and should read -- object either: extends between the head pieces; or in --.

Column 6,
Line 14, now reads "elogated....", and should read -- elongated... --.
Line 33, now reads "were the strand...", and should read -- where the strand... --.
Line 36, now reads "the coil form....", and should read -- the coil forms... --.

Signed and Sealed this

Twenty-second Day of March, 2005

JON W. DUDAS
*Director of the United States Patent and Trademark Office*